3,265,713
3-MERCAPTOANDROSTAN-17β-OL AND ITS ACYLATE

Junichi Kawanami, Nishinomiya-shi, Hyogo Prefecture, Japan, assignor to Shionogi & Co., Ltd., Higashi-ku, Osaka, Japan
No Drawing. Filed Aug. 28, 1964, Ser. No. 392,903
5 Claims. (Cl. 260—397.5)

The present invention relates to 3-marcaptoandrostan-17β-ol and its acylate represented by the formula:

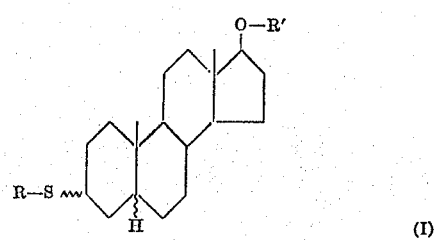

where in the ripple mark (⌇) represents α- or β-configuration and R and R' are each a hydrogen atom or an acyl group. The said acyl group is preferably derived from carboxylic acids having from one to about twelve carbon atoms, conventionally employed in the steroid art, and having a molecular weight less than about 200. Representative of the acyl group which can be present are lower alkanoyl (e.g. formyl, acetyl, propionyl, butyryl, isobutyryl, caproyl, heptanoyl, octanoyl, trimethylacetyl), lower alkenoyl (e.g. crotonoyl, undecenoyl), carboxy(lower)alkanoyl (e.g. succinyl), cycloalkyl-(lower)alkanoyl (e.g. β-cyclopentylpropionyl, β-cyclohexylpropionyl), monocarbocyclic aroyl (e.g. benzoyl, p - toluyl, p - nitrobenzoyl, 3,4,5 - trimethoxybenzoyl), monocarbocyclic aryl(lower)alkanoyl or alkenoyl (e.g. phenylacetyl, β-phenylpropionyl, cinnamoyl) and monocarbocyclic aryloxy(lower)alkanoyl (e.g. p - chlorophenoxyacetyl).

It is a basic object of the present invention to embody 3 - mercaptoandrostan - 17β - ol and its acylate of Formula I. Another object of this invention is to embody 3 - mercaptoandrostan - 17β - ol and its acylate of Formula I having physiological activity. A further object of the invention is to embody a process for preparing 3 - mercaptoandrostan - 17β - ol and its acylate of Formula I. These and other objects will be apparent to those conversant with the art to which the present invention pertains from the subsequent description.

According to the present invention, the objective 3-mercaptoandrostan - 17β - ol and its acylate of Formula I are prepared by reducing 3 - thiocyanatoandrostan-17-one, or 3 - thiocyanatoandrostan - 17β - ol or its acylate with a reducing agent, if necessary, followed by acylation. Such conversions may be represented by the following formulae:

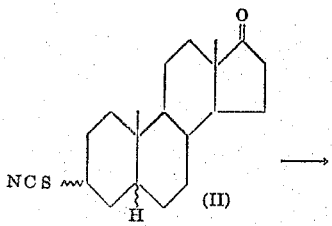

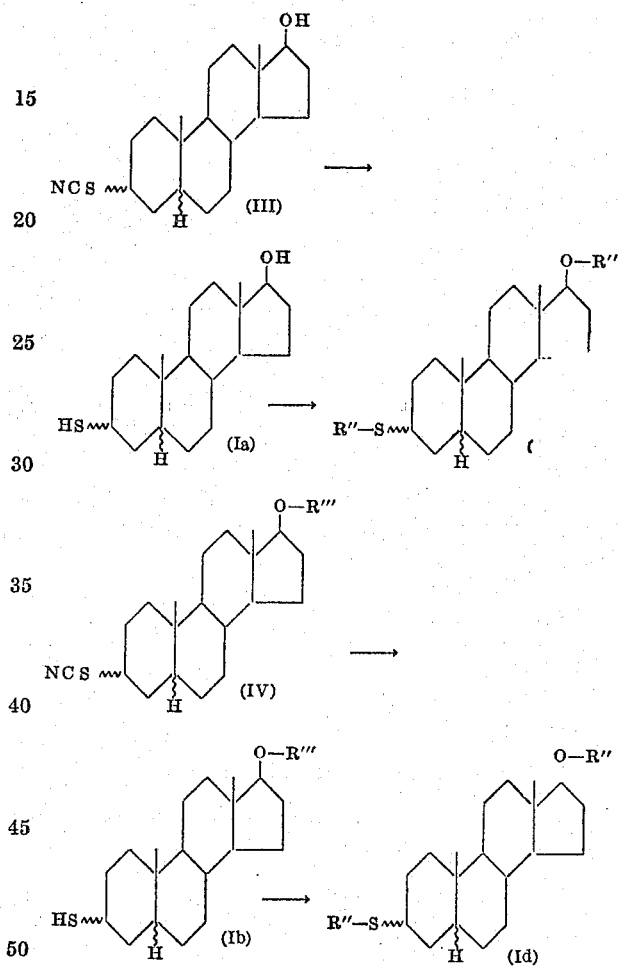

wherein R'' and R''' are each an acyl group as illustrated above.

The starting materials, i.e. 3 - thiocyanatoandrostan-17-one of Formula II, 3 - thiocyanatoandrostan - 17β-ol of Formula III and 3 - thiocyanatoandrostan - 17β-ol 17-acylate of Formula IV, may be each prepared by reacting the corresponding 3 - toluenesulfonyloxysteroid with thiocyanate ion in an aprotic solvent [Henbest et al.: J. Chem. Soc., p. 954 (1962)].

The reduction is usually effected by treating the starting material of Formula II, III or IV with a reducing agent such as a metallic hydride (e.g. lithium aluminum hydride (potassium aluminum hydride, sodium borohydride, lithium borohydride) in an inert solvent (e.g. ether, dioxane, tetrahydrofuran, methanol, ethanol, water) at a wide range of temperature from room temperature (10 to 30° C.) to reflux temperature. The subsequent acylation may be carried out in a conventional manner, e.g. treatment with a carboxylic acid anhydride or halide in the presence of an acidic or a basic catalyst.

The thus prepared 3-mercaptoandrostan-17β-ol and its acylate of Formula I are useful an anti-progestational, anti-uterotropic and anti-deciduomatogenic agents.

The following examples set forth presently-preferred embodiments of the present invention.

*Example 1*

To a suspension of lithium aluminum hydride (150 mg.) in anhydrous ether (10 ml.), there is dropwise added a solution of 3α-thiocyanato-5α-androstan-17-one (300 mg.) in anhydrous ether (30 ml.) at room temperature (10 to 30° C.), and the resulting mixture is stirred for 2 hours. The reaction mixture is acidified with hydrochloric acid and shaken with a mixture of ether and chloroform. The organic solvent layer is evaporated and crystallized from methanol to give 3α - mercapto-5α - androstan - 17β - ol as crystals melting at 143 to 144° C. Yield, 90%.

The above prepared 3α - mercapto - 5α - androstan-17β-ol is reacted with acetic anhydride in pyridine on a water bath for 2 hours. The reaction mixture is treated in a conventional manner to give 3α-acetylthio-17β - acetyloxy - 5α - androstane as crystals melting at 150 to 151° C. (crystallized from methanol).

*Example 2*

3β - thiocyanato - 5α - androstan - 17 - one (1 g.) is reacted with lithium aluminum hydride (0.5 g.) in anhydrous ether (100 ml.) and the reaction mixture treated as in Example 1. Recrystallization of the product from acetone gives 3β - mercapto - 5α - androstan - 17β - ol as needles melting at 160 to 161° C. Yield, 90%.

The above prepared 3β - mercapto - 5α - androstan-17β-ol is reacted with acetic anhydride in pyridine at room temperature overnight. The reaction mixture is treated in a conventional manner to give 3β - acetylthio-17β - acetyloxy - 5α - androstane as crystals melting at 111 to 112° C. (crystallized from methanol).

*Example 3*

A solution of 3α - thiocyanato - 5α - androstan - 17-one (100 mg.) in a mixture of tetrahydrofuran (10 ml.) and water (1 ml.) is refluxed for 4 hours while addition of sodium borohydride (200 mg.) in several times. The reaction mixture is acidified with hydrochloric acid and shaken with a mixture of ether and chloroform. The organic solvent layer is evaporated and crystallized from methanol to give 3α - mercapto - 5α - androstan-17β-ol as crystals melting at 143 to 144° C. Yield, 85%.

*Example 4*

To a solution of 3α - thiocyanato - 5α - androstan-17β-ol (1 g.) in anhydrous tetrahydrofuran (20 ml.), there is dropwise added a solution of lithium aluminum hydride (250 mg.) in anhydrous tetrahydrofuran (100 ml.) while stirring under cooling with ice, and the resulting mixture is stirred for 1 hour at room temperature. The reaction mixture is acidified with hydrochloric acid and shaken with chloroform. The chloroform layer is washed with water, dried over anhydrous sodium sulfate and the solvent evaporated. The residue is crystallized from methanol to give 3α - mercapto-5α - androstan - 17β - ol as crystals melting at 143 to 144° C. Yield, 92%.

*Example 5*

To a solution of 3α - thiocyanato - 5α - androstan - 17β-ol (1 g.) in methanol (20 ml.), there is added water (0.5 ml.), and the resultant mixture is refluxed for 3 hours while addition of sodium borohydride (1 g.) in several times. The reaction mixture is acidified with hydrochloric acid and shaken with chloroform. The chloroform layer is washed with water, dried over anhydrous sodium sulfate and the solvent evaporated. The residue is crystallized from methanol to give 3α-mercapto - 5α - androstan - 17β - ol as crystals melting at 143 to 144° C. Yield, 88%.

*Example 6*

A solution of 3α - thiocyanato - 17β - acetyloxy-5α-androstane (500 mg.) in a mixture of tetrahydrofuran (30 ml.) and water (3 ml.) is refluxed for 4 hours while addition of sodium borohydride (500 mg.) in several times. The reaction mixture is acidified with hydrochloric acid and shaken with chloroform. The chloroform layer is washed with water, dried over anhydrous sodium sulfate and the solvent evaporated. The residue is crystallized from methanol to give 3α-mercapto-17β-acetyloxy-5α-androstane as crystals.

The above prepared 3α - mercapto - 17β - acetyloxy-5α-androstane is reacted with propionic anhydride in pyridine on a water bath for 3 hours. The reaction mixture is treated in a conventional manner to give 3α-propionylthio-17β-acetyloxy-5α-androstane.

What is claimed is:
1. A steroid of the formula:

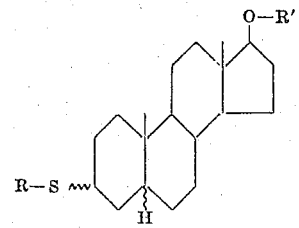

wherein the ripple mark (⌇) is a generic indication of α- and β-configurations and R and R′ are each a member selected from the group consisting of hydrogen and acyl, the acyl being a carboxylic acyl group having from one to twelve carbon atoms and a molecular weight less than about 200.
2. 3α-mercapto-5α-androstan-17β-ol.
3. 3α-acetylthio-17β-acetyloxy-5α-androstane.
4. 3β-mercapto-5α-androstan-17β-ol.
5. 3β-acetylthio-17β-acetyloxy-5α-androstane.

No references cited.

LEWIS GOTTS, *Primary Examiner.*

JOHNNIE R. BROWN, *Assistant Examiner.*